United States Patent
Casey et al.

(10) Patent No.: US 7,983,243 B2
(45) Date of Patent: Jul. 19, 2011

(54) SYSTEM AND METHOD FOR INCREASING CALL CAPACITY FOR A WIRELESS LOCAL AREA NETWORK

(75) Inventors: Liam Casey, Ottawa (CA); David Allan, Ottawa (CA); Jerome Chiabaut, Ottawa (CA)

(73) Assignee: Avaya, Inc., Basking Ridge, NJ (US)

( * ) Notice: Subject to any disclaimer, the term of this patent is extended or adjusted under 35 U.S.C. 154(b) by 1480 days.

(21) Appl. No.: 10/822,427

(22) Filed: Apr. 12, 2004

(65) Prior Publication Data

US 2005/0226219 A1    Oct. 13, 2005

(51) Int. Cl.
*H04L 12/66* (2006.01)
*H04L 12/56* (2006.01)
*H04L 12/28* (2006.01)

(52) U.S. Cl. ............... 370/352; 370/395.21; 370/401

(58) Field of Classification Search .......... 370/351–356, 370/395.1, 395.2, 395.12, 395.43, 401, 395.21; 455/435.1; 709/223, 228, 352, 401; 379/221.02
See application file for complete search history.

(56) References Cited

U.S. PATENT DOCUMENTS

| | | | |
|---|---|---|---|
| 6,912,232 B1 * | 6/2005 | Duffield et al. ............... 370/468 |
| 7,072,959 B2 * | 7/2006 | Huart et al. .................. 709/223 |
| 7,218,722 B1 * | 5/2007 | Turner et al. ................ 379/221.02 |
| 7,283,541 B2 * | 10/2007 | Michelson et al. ........... 370/401 |
| 2002/0041588 A1 * | 4/2002 | Gleneck ....................... 370/352 |
| 2002/0095529 A1 * | 7/2002 | Syvanne ....................... 709/330 |
| 2002/0124090 A1 * | 9/2002 | Poier et al. ................... 709/228 |
| 2003/0219014 A1 * | 11/2003 | Kotabe et al. ................ 370/375 |
| 2004/0156356 A1 * | 8/2004 | Baeder ......................... 370/352 |
| 2004/0259544 A1 * | 12/2004 | Amos ........................... 455/435.1 |

* cited by examiner

*Primary Examiner* — Ahmad F Matar
*Assistant Examiner* — Sonia Gay
(74) *Attorney, Agent, or Firm* — David A. Dagg

(57) ABSTRACT

A system for increasing the call capacity of an access point in a WLAN that determines whether a maximum total voice path delay would be exceeded if the packetization delay is increased for packets in a call. In the event that the packetization delay can be increased without the total delay exceeding the maximum delay, the disclosed system increases the size of packets used in the call, if all participating devices can process the increased packet size. The maximum delay may be predetermined, and reflect a maximum delay that cannot be exceeded without adversely impacting the voice quality of a call. If the two end points for a call are determined to be physically "local" to each other, packetization delay for the call may be increased based on the assumption that the increased packetization delay will not decrease the voice quality of the call.

18 Claims, 2 Drawing Sheets

SYSTEM AND METHOD FOR INCREASING CALL CAPACITY FOR A WIRELESS LOCAL AREA NETWORK

FIELD OF THE INVENTION

The present invention relates generally to wireless communication networks, and more specifically to a system and method for increasing call capacity for an access point in a wireless local area network.

BACKGROUND OF THE INVENTION

Wireless local area networks (WLANs) are increasingly being used to carry voice data transmitted in calls to and/or from mobile devices such as WLAN-phones. However, existing WLAN protocols are not well suited to carrying voice data. For example, in WLANs conforming to IEEE 802.11 standards, the PHY and MAC protocols add substantial overhead to each data packet. This additional overhead significantly limits the number of packets per second that can be carried, using either 802.11b's 11 Mb/s, or 802.11a and 802.11g's 54 Mb/s capacity. A limitation on number of packets per second is not unique to WLANs, and other specific types of networks also suffer from the same limitation. In any type of network with a packets per second limitation, the number of simultaneous calls that can be supported may be limited as a result.

In communicating voice data over a packet network, degradation of voice quality will occur if there are excessive voice path delays. The total delay for a voice path over a packet network includes a number of components, including "packetization delay". Packetization delay is the time required to collect voice samples into a packet prior to transmitting the packet onto the network. In general, if the total one way voice path delay for a call is much higher than about 150 ms, the voice quality of the call noticeably deteriorates. To ensure that the total delay for voice data stays within acceptable limits, existing systems use a fixed delay budget for all calls, including a fixed bound on packetization delay. For example, many existing systems allocate 20 ms of packetization delay per packet. Voice data contained in each packet is therefore limited to 20 ms worth of voice samples. As a result, each phone on the WLAN transmits 50 relatively small packets per second. Under such conditions, simulations and measurements show that the total number of simultaneous calls a single 802.11b access point can support is around 10. Moreover, this maximum call capacity can only be reached if the WLAN phones are relatively close to the wireless access point, and there is no interference from other access points (or other devices). In fact, a more realistic figure may be 3 concurrent calls per access point using a packet transmission interval of 20 ms.

For the Internet, and increasingly all networks, voice data for phone calls is conveyed using Internet Protocol (IP) packets, using what are referred to as Voice over IP (VoIP) phones. As in all digitized voice communications, "codec" (COder/DECoder) technology is used to convert analog voice signals into digital samples to be carried in packets. One approach to increasing network capacity for VoIP systems has been to use relatively low bit rate codecs, effectively making the VoIP packets smaller. The use of low bit rate codecs is even more prevalent in cellular phone access networks. However, this approach adds complexity and delay to the voice encoding/decoding process, since a number of voice samples have to be gathered before the substantial voice compression processing can take place. Moreover, the resulting smaller packets do not significantly improve call capacity for an access point in the WLAN context, since the limiting factor in the WLAN case is the number of transmission opportunities per second.

In another area of development, the 802.11 MAC protocol may eventually be updated to make it more suitable to carrying voice data. However, any future MAC improvements are believed to be supplemental to the improvements provided by the disclosed system.

For the reasons stated above and others, it would be desirable to have a new system for providing voice data paths through WLANs that increases the number of concurrent calls that can be handled through an access point. In particular, it would be desirable to have a system that increases the packet transmission interval of devices using a WLAN, in order to permit more calls to be handled without exceeding limitations on packets per second transmitted on the network.

SUMMARY OF THE INVENTION

To address the above described shortcomings of existing systems and others, a system and method for increasing the call capacity of an access point in a WLAN are disclosed. The disclosed system operates by determining whether a maximum total delay would be exceeded if a packetization delay component for a requested call is increased. In the event the packetization delay for the call can be increased without the total delay exceeding the maximum, and all participating devices can support the increase, the disclosed system increases the size of packets used in the call. In this way the packet transmission interval, equal to the time between packet transmissions, may be increased, and the packet transmission rate for the call decreased. The maximum permitted delay may be predetermined, for example, as the amount of delay that cannot be exceeded without adversely impacting the voice quality of a call.

Thus there is disclosed a system for providing voice data paths through WLANs that increases the number of concurrent calls that can be handled. The disclosed system advantageously increases the packet transmission interval for calls through the WLAN, to permit more calls to be handled simultaneously through an access point without exceeding a limitation on transmitted packets per second on the network.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
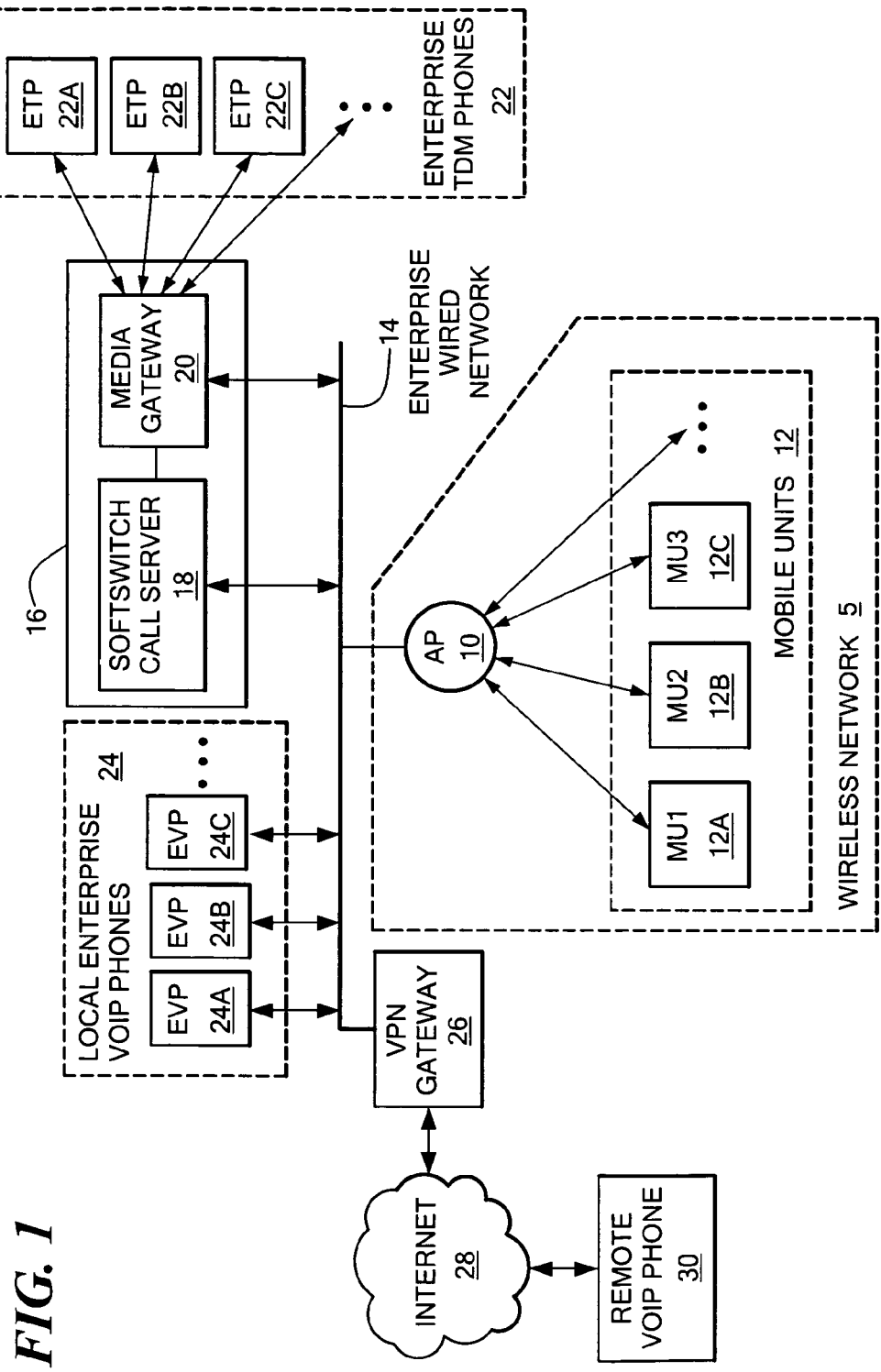
FIG. 1 is a block diagram of devices in an illustrative embodiment.

As shown in FIG. 1, a wireless network 5, such as a Wireless Local Area Network (WLAN), includes an access point device (AP) 10 and a number of mobile units 12, shown for purposes of illustration including mobile units 12A, 12B and 12C. The mobile units 12 may be any specific type of device capable of participating in a phone call over the WLAN 5 through the AP 10, such as WLAN phones or other WLAN devices with IP telephony hardware or software. The AP 10 may be any specific kind or type of WLAN access point operable to support the bridging of packets between the wireless network 5 and the enterprise wired network 14, and the wireless network 5 may be any specific type of WLAN, such as, for example, a WLAN conformant with one or more of the IEEE 802.11 standards.

The AP 10 interconnects the wireless network 5 with an enterprise wired network 14. The enterprise wired network 14 may be any appropriate type of network, using any appropriate type of communication media and protocols, such as an Ethernet-based LAN. The wired network 14 transports both the signaling and voice data transfers for VoIP ("Voice over IP") telephony operation. Interconnected with the wired network 14 are shown some number of local VoIP phones, a VPN ("Virtual Private Network") gateway 26, a soft-switch call server 18, and a media gateway 20. The media gateway 20 interconnects some number of enterprise TDM (Time Division Multiplexing) phones 22 to the wired network 14. The TDM phones 22 are shown for purposes of illustration as including enterprise TDM phones 22A, 22B and 22c. The TDM phones 22 are telephones such as are also used connected to a PBX or Key System. They represent the phones that were not upgraded when the Enterprise replaced its PBX or Key System with a VoIP telephony system 16. The telecommunications device 16 may be embodied as a programmable network switch that can process the signaling protocols for various types of packet protocols.

The local enterprise VoIP ("Voice over Internet Protocol") phones 24 may be any specific type of IP phone that may be coupled to a wired network, such as those that are based on the ITU digital voice standards known as the "G." standards, including G.711 and others. The VPN gateway 26 supports one or more VPNs through the Internet 28 to remote VoIP phones, such as the remote VoIP phone 30.

Each of the devices shown in FIG. 1 includes software programs stored in some type of program memory, and executable on one or more processors. Additionally, each of the devices shown in FIG. 1 may include hardware logic operable to perform customized functions. Accordingly, the devices shown in FIG. 1 may embody functions of the present invention using software logic, hardware logic, or some combination of software and hardware logic. The disclosed system may be embodied by specific functionality included within WLAN phones, call servers, VoIP phones, and media gateways within an enterprise, such as those shown in FIG. 1. For example, one or more call servers such as the soft-switch call server 18 of FIG. 1 may operate to determine when a requested call can use an increased packetization delay without exceeding a maximum delay. Additionally, WLAN and VoIP phones and media gateways within the enterprise may operate to vary the packetization delay and transmission rate of voice packets on a call by call basis. For example, the IP phones shown as the mobile units 12, the local enterprise VoIP phones 24, and the media gateway 20 may be operable to vary the packetization delay and transmission rate of voice packets for certain calls.

In one embodiment of the disclosed system, the soft-switch call server 18 operates to determine whether the caller and called party are sufficiently "local" to each other by using the DNs (directory numbers) of the caller and called party during call setup. The soft-switch call server 18 accordingly stores location indications in association with DNs to support this determination. For example, those DNs associated with a single enterprise site or location could be considered local to each other, and therefore a call within a single site could be determined eligible for using an increased packetization delay over a default packetization delay.

In such an exemplary embodiment, a VoIP signaling protocol used to set up a call, such as SIP (Session Initiation Protocol) or some other protocol, can be used to determine whether an increased packetization delay can be handled by the equipment needed to connect the call. For example, when SIP signaling is used, the call server 18 may operate to modify SDP (Session Description Protocol) parameters offered to the terminating equipment of the called party to indicate that the packet transmission interval should be increased from a default value to some greater length for the requested call. Such an increased packet transmission interval may be any specific value appropriate to a given implementation and operational environment. For example, the packet transmission interval might be increased to 80 ms for the requested call from a default of 20 ms for other calls. The SDP parameters may also indicate codec options for the requested call, and the call server 18 may also limit the potential packetization delay options offered in order to reduce packet size. However, reducing packet size may not be of great importance in a tightly designed WLAN deployment.

Subsequently, when the requested call progresses to an Accept stage in the SIP call set-up process, the call server 18 operates to alter the SDP parameters going to the call originator equipment to match the packet interval indicated by the called party's terminating party equipment. The equipment of both the caller and the called party are in this way set up to use the longer packet interval when the talk phase of the connected call begins.

Since a call set up in this way transmits fewer packets that would ordinarily be the case, the limitation on number of packets transmitted on the WLAN is not reached as quickly. For example, in the case where the packet transmission interval is increased to 80 ms from 20 ms, thus increasing the amount of voice data stored in each packet to 80 ms worth of samples, only one quarter of the number of packets are transmitted. Accordingly, a WLAN access point will advantageously be able to support almost four times as many simultaneous voice calls. Moreover, since 80 ms is still well beneath a noticeable delay for real time voice communications, voice quality is maintained. The actual benefit of the disclosed system will depend on the proportion of calls determined to be "local" and of those, the proportion that are between terminals equipped to handle extended intervals between voice packet transmissions. An enterprise voice system may be deployed where only the mobile units 12 have the disclosed extended packet transmission interval capability. A next level of improvement would be gained if the media gateway 20 included extended packet transmission interval capability, so that calls between mobile units 12 and TDM phones 22 can use the extended packet transmission intervals. Additionally, if the wire line VoIP phones 24 also had the extended packet transmission interval capability, than all calls in the enterprise involving one of the mobile units 12 could use the disclosed extended packet protocol.

Those skilled in the art will recognize that VoIP signaling protocols other than SIP, such as H.323, H.248/Megaco, Unistim etc., have equivalent ways of specifying media streams to each end party, and that these protocols can also be used by the call server to set the packet transmission interval for a call.

While the above description refers to using DNs for determining if a terminal device for a requested call is local to the caller or not, the present invention is not so limited. Accordingly, other techniques may be applied to determine whether a call can employ an extended packet transmission interval. For example, during a registration process, local and remote terminal devices may explicitly indicate their ability to alter the packet interval to the call server 18, or the call server 18 may operate to determine their capabilities in this regard. Moreover, the disclosed system may be embodied to determine if a user is using a usually local IP phone from an external site, over the Internet, through a VPN tunnel. As shown in FIG. 1, a user may be using a remote VoIP phone 30 in a call conveyed over the internet, through the VPN gateway 26. The VoIP phone 30 may be a phone that can be connected directly to the wired network 14 within the enterprise at other times. In such a case, the disclosed system operates to determine if the phone is not currently local based on a characteristic other than DN, since the DN may be the same whether the phone is being used locally or remotely. For example, the VoIP phone 30 may indicate whether it is currently local or remote to the call server 18 during a SIP register operation or the equivalent. Location status may be determined by the remote VoIP phone 30 by a VoIP client process on the remote VoIP phone 30 detecting that a VPN client process is operating beneath it to convey calls over the Internet 28. Further, a determination of whether a phone is using a VPN may be made by a comparison of a current IP address used by the phone with a normal "local" IP address for the phone stored in the call server 18. If the current IP address for the phone does not match the stored IP address, then the call server 18 determines that the phone is being used remotely through a VPN gateway, such as the VPN gateway 26.

In an alternative embodiment, the call server 18 processes each call by determining what the total transmission delay of each packet in the media stream for the call would be if the call were connected. One realization of this would be for the call server 18 to use the IP PING protocol and "ping" each terminal of the call. From the PING response times the call server will be able derive an upper bound estimate on the total transmission delay for the voice packets of the call being set up. The call server 18 then calculates, or looks up in a table entry, an increased packet transmission interval for the requested call that will deliver adequate voice response. The call server 18 then signals the packet transmission interval determined in this way to each terminal of the call.

Figure 2:
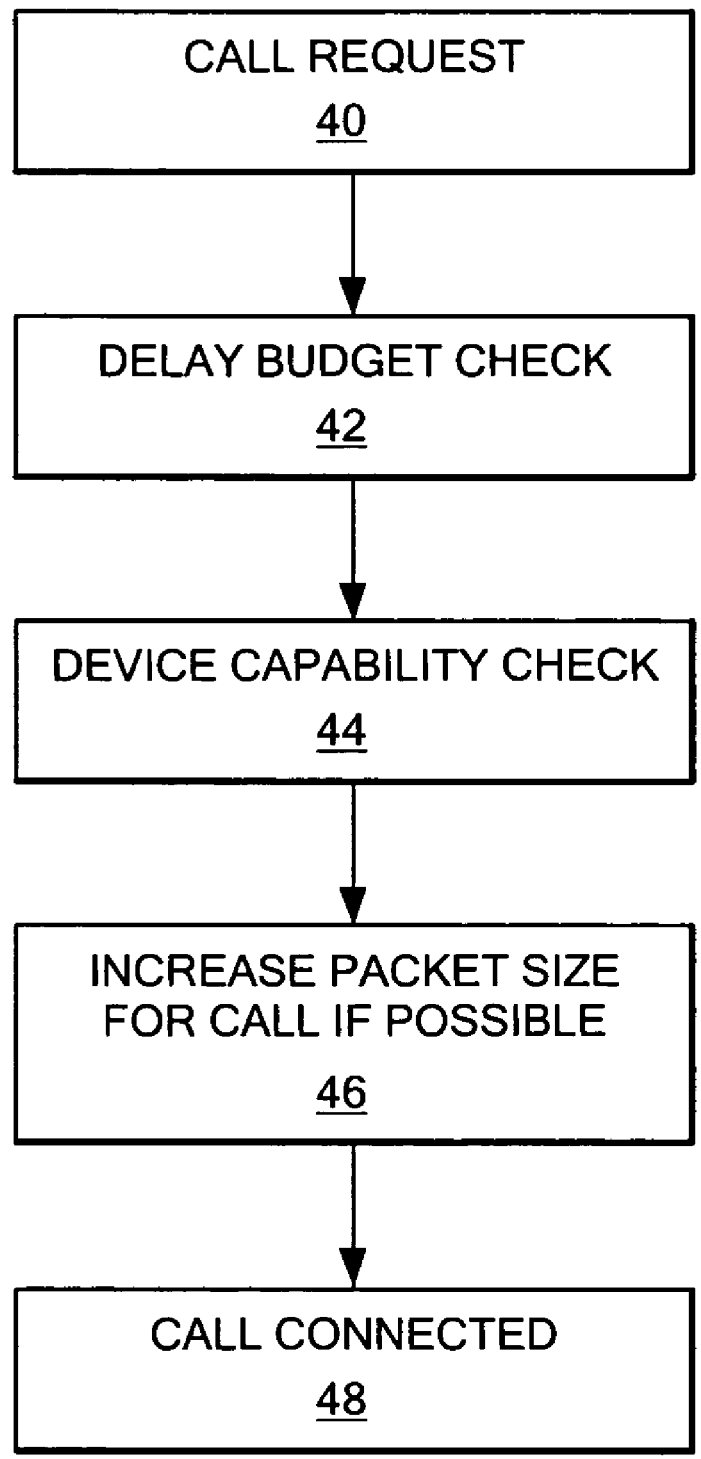
FIG. 2 is a flow chart showing steps performed in an illustrative embodiment.

FIG. 2 is a flow chart showing steps performed in an illustrative embodiment of the disclosed system. As shown in FIG. 2, at step 40 a call request is received at a call server system, for example as a result of a phone call placed from a WLAN phone. At step 42 the call server performs a delay budget check to determine whether the packet size, and accordingly the packet transmission interval for the requested call can be increased. Any specific technique may be used to determine whether the packet size for a call can be increased. In one embodiment, the disclosed system determines whether the call is "local". For example, a call within a single enterprise site may be considered to be a local call. At step 44, the call server also checks as to whether the devices needed to support the requested call, such as terminating IP phones, media gateways, etc. can handle the increased packet size and resulting increased packet transmission interval. If the call is determined to be local at step 42, and the relevant devices can support an increased packet size, then at step 46 the disclosed system informs the relevant devices of the increased size of the packets to be used in the call. At step 48, the call is connected, and the voice packets generated using the increased packetization interval are used to convey the voice data for the call. The increased packetization interval results in each packet being loaded with an increased number of voice samples, and in a decrease in the packet transmission rate for the call.

For example, as noted above, if the total delay for a call is much higher than about 150 ms, the voice quality of the call noticeably deteriorates. Accordingly, the disclosed system may be embodied to operate such that this total is not exceeded. Previous systems have ensured that the total delay stayed within acceptable limits by defining a fixed packetization delay budget for all calls, such as the above mentioned 20 ms. While these specific limits may be appropriate when a call must be carried between widely separated geographic locations, the disclosed system takes advantage of the fact that they may be relaxed when a call is relatively local. By increasing the packet size, and lowering the packet transmission rate for a given call, the disclosed system allows more calls to be supported by an access point for a wireless network. For example, if the packetization interval can be increased from 20 ms to 80 ms, almost four times as many concurrent calls can be supported by an access point.

While the disclosed system is described with regard to WLAN implementations, it is not so limited. The disclosed system is applicable to any packet network carrying voice packets where media capacity is dominated by packets per second, rather than bytes per second. WLANs are just a current example of such networks.

The above description of the preferred embodiments include a flowchart and a block diagram illustration of methods, apparatus (systems) and computer program products according to an embodiment of the invention. Those skilled in the art will recognize that the specific orders of steps shown in the flow chart are given purely for purposes of illustration, and that the actual order in which the described operations are performed may vary between embodiments, configurations, or based on specific operational conditions. It will be further understood that each block of the flowchart and block diagram illustrations, and combinations of blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem.

Finally, while the invention is described through the above exemplary embodiments, it will be understood by those of ordinary skill in the art that modification to and variation of the illustrated embodiments may be made without departing from the inventive concepts herein disclosed. Accordingly, the invention should not be viewed as limited except by the scope and spirit of the appended claims.

We claim:

1. A method, embodied in a device including at least one processor and a computer readable memory, the device providing voice communications over a packet-based data communication network by:

receiving a call request;
determining whether the requested call would span a virtual private network gateway connecting a local network to an external network at least in part by comparing a current Internet Protocol (IP) address of a calling party phone to be used in the requested call with a local IP address associated with the calling party phone, and determining that the requested call would span the virtual private network gateway connecting the local network to the external network in response to detecting a mismatch between the current IP address of the calling party phone and the local IP address of the calling party phone; and
in response to a determination that the requested call would not span the virtual private network gateway connecting the local network to the external network, increasing a size of packets used in the call.

2. The method of claim 1, further comprising:
determining whether a total delay for the requested call would exceed a predetermined maximum delay if a packetization delay component is increased for the requested call responsive to stored information in a call server system indicating whether a called party phone is local to the calling party phone; and
increasing the size of packets used in the requested call only in the event that the packetization delay for the requested call can be increased without exceeding the predetermined maximum delay.

3. The method of claim 1, further comprising:
determining whether a total delay of the requested call would exceed a predetermined maximum delay if a packetization delay component is increased for the requested call responsive to a directory number of the calling party phone and a directory number of a called party phone; and
increasing the size of packets used in the requested call only in the event that the packetization delay for the requested call can be increased without exceeding the predetermined maximum delay.

4. The method of claim 1, further comprising determining whether the calling party phone and a called party phone can process an increased packet size, and only increasing the size of packets used in the call in the event that both the calling party phone and the called party phone can process the increased packet size.

5. The method of claim 1, wherein the increasing the size of packets used in said call comprises increasing the size of packets used in the call to a packet size above a default packet size.

6. The method of claim 2, wherein the maximum delay is a value that cannot be exceeded without adversely impacting the voice quality of the call.

7. A system, including at least one processor and a computer readable memory, for providing voice communications over a packet-based data communication network, comprising:
request processing logic for receiving a call request;
gateway determining logic for determining whether the requested call would span a virtual private network gateway connecting a local network to an external network at least in part by comparing a current Internet Protocol (IP) address of a calling party phone to be used in the requested call with a local IP address associated with the calling party phone, and determining that the requested call would span the virtual private network gateway connecting the local network to the external network in response to detecting a mismatch between the current IP address of the calling party phone and the local IP address of the calling party phone; and
packet size increasing logic for, responsive to a determination that the requested call would not span the virtual private network gateway connecting the local network to the external network, increasing a size of packets used in the call.

8. The system of claim 7, further comprising:
delay determining logic for determining whether a total delay for the requested call would exceed a predetermined maximum delay if a packetization delay component is increased for the requested call responsive to stored information in a call server system indicating whether a called party phone is local to the calling party phone; and
wherein the packet size increasing logic increases the size of packets used in the requested call only in the event that the packetization delay for the request call can be increased without exceeding the predetermined maximum delay.

9. The system of claim 7, further comprising:
delay determining logic for determining whether a total delay of the requested call would exceed a predetermined maximum delay if a packetization delay component is increased for the requested call responsive to a directory number of the calling party phone and a directory number of a called party phone; and
wherein the packet size increasing logic increases the size of packets used in the requested call only in the event that the packetization delay for the requested call can be increased without exceeding the predetermined maximum delay.

10. The system of claim 7, wherein the packet size increasing logic further determines whether the calling party phone and a called party phone can process an increased packet size, and wherein the packet size increasing logic only increases the size of packets used in the call in the event that both the calling party phone and the called party phone can process the increased packet size.

11. The system of claim 7, wherein the packet size increasing logic increases the size of packets used in the call by increasing the size of packets used in the call to a packet size above a default packet size.

12. The system of claim 8, wherein said maximum delay is a value that cannot be exceeded without adversely impacting the voice quality of the call.

13. The method of claim 1, further comprising:
wherein the local network is a wireless network;
wherein the external network is the internet; and
wherein the calling party phone for the requested call is located on the wireless network.

14. The method of claim 1, further comprising:
wherein the local network is a wireless network;
wherein the external network is the internet; and
wherein a called party phone terminating the requested call is located on the wireless network.

15. The system of claim 7, further comprising:
wherein the local network is a wireless network;
wherein the external network is the internet; and
wherein the calling party phone for the requested call is located on the wireless network.

16. The system of claim 7, further comprising:
wherein the local network is a wireless network;
wherein the external network is the internet; and
wherein a called party phone terminating the requested call is located on the wireless network.

17. The method of claim 1, further comprising:
wherein the calling party phone comprises a Voice over Internet Protocol (VoIP) phone.

18. The system of claim 7, further comprising:
wherein the calling party phone comprises a Voice over Internet Protocol (VoIP).

* * * * *